The benzene conversion vs carbon number of a series of catalysts treated with $X_3P$ at room temperature and subsequently heated to 200°C in $H_2$, hydrogen tests at 100°C.

The dependence of the selectivity to methyl butenes and the benzene conversion on the catalyst phosphorus content

United States Patent Office 3,642,658
Patented Feb. 15, 1972

3,642,658
SELECTIVE HYDROGENATION CATALYSTS
Keith George Allum, Bagshot, Christopher John Leonard Metcalfe, Sunbury, and Daniel John Thomasson, Hanworth, Feltham, England, assignors to The British Petroleum Company Limited, London, England
Filed Dec. 19, 1968, Ser. No. 785,219
Claims priority, application Great Britain, Dec. 21, 1967, 58,033/67
Int. Cl. C07c *11/00*
U.S. Cl. 252—431 P                                      11 Claims

ABSTRACT OF THE DISCLOSURE

Catalysts suitable for the selective hydrogenation of diolefins to mono-olefins are prepared by contacting a Group VIII metal surface e.g., Ni or Pt, with a Group V compound of formula $X_3M$, where X is an organic radical, H or Cl and M is an atom of phosphorus, arsenic or antimony so that the Group V element or compound is absorbed onto the metal surface. Preferred Group V compounds are: $(C_6H_5)_3P$, $Et_3P$, $(nC_4H_9)_3P$, trioctyl phosphine, tricyclohexyl phosphine and triisopropyl phosphine. In a modification a compound of formula $$\phi_2P-(CH_2)xCH_2-P\phi_2$$

Figure 1:
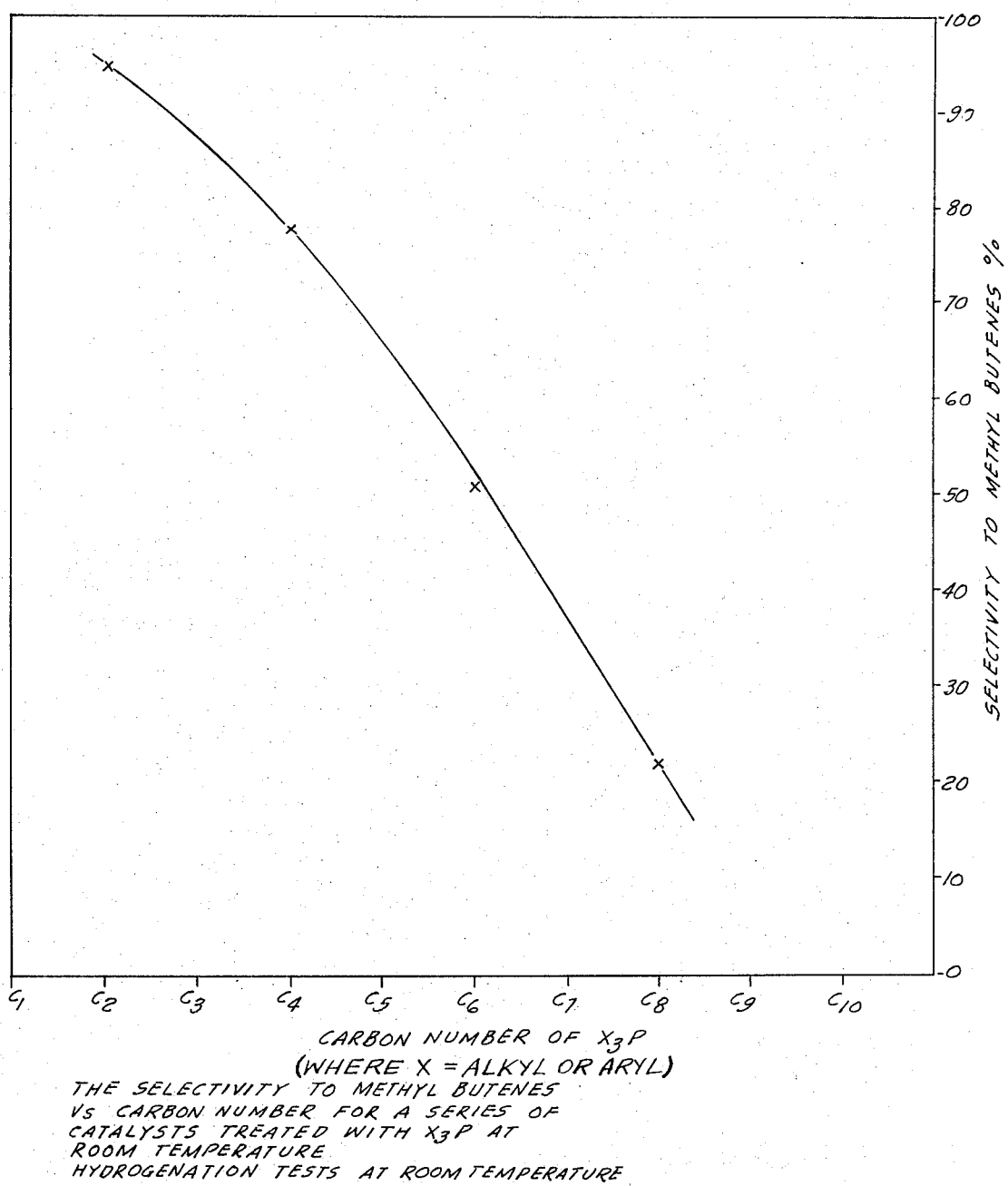

where $x$ is 0 or an integer and $\phi$ is phenyl group may be employed.

---

This invention relates to the preparation of Group VIII metal catalysts.

Group VIII metals are well known catalysts, particularly for hydrogenation and dehydrogenation reactions. The fresh metal surface has a high activity, and is, for example, capable of hydrogenating any unsaturated hydrocarbon including aromatics. For some reactions, however, the catalyst is required to have selective activity. In the field of hydrogenating the catalyst may be required to hydrogenate olefins or acetylenes without hydrogenating aromatics and within the field of olefin hydrogenation there is also a further selectivity possible, the selective hydrogenation of diolefins to mono-olefins, leaving both mono-olefins and any aromatics untouched.

The present invention is concerned with the treatment of a Group VIII metal surface to modify its catalytic activity.

According to the present invention a method of preparing a catalyst comprises contacting a Group VIII metal surface with a compound of an element of Group V so that the Group V element or compound is adsorbed onto the metal surface, the Group V compound having the general formula $X_3M$ where X is an organic radical, a hydrogen or halogen atom, the X radicals being the same or different, and M is an atom of phosphorus, arsenic, antimony or bismuth; and in the case where M is phosphorus at lease one of the X radicals may be

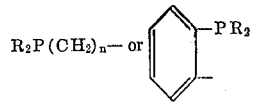

where $n$ is zero or an integer from 1 to 20 and where R is a $C_1$ to $C_{20}$ hydrocarbon radical, in addition to those specified above, and with the proviso that when M is bismuth the X radicals are hydrogen atoms or $C_1$ to $C_6$ hydrocarbon groups and may be the same or different.

The preferred Group VIII metals are those of the nickel triad i.e. nickel, palladium and platinum, particularly nickel. The Group VIII metal is preferably carried on a support in a known manner. Any of the known catalysts supports may be used, for example natural or synthetic refractory oxides of elements of Groups II to IV of the Periodic Table particularly silica and/or alumina, natural or synthetic refractory silicates particularly alumino-silicates and/or magnesium silicates such as sepiolite, and activated carbon.

The Group VIII metal should be in elemental form before contact with the compound of Group V and, again, any known method of applying Group VIII metal compounds to a support and reducing the compounds to elemental metal may be used. Preferably nickel formate in ammonia solution is used to impregnate a support and the nickel formate is reduced at 200–550° C. in a stream of inert gas or hydrogen. The Group VIII metal content of a supported catalyst may be from 0.1 to 50% wt. by weight of total catalyst, particularly 5–35% wt. of nickel.

In the step of contacting the metal surface with the Group V compound and in the subsequent use of the modified metal, three main variables exist. These are (a) the Group V element used
(b) the other element or radical of the Group V compound
(c) the conditions of contacting and the subsequent conditions to which the metal is exposed.

The preferred Group V elements are phosphorus and antimony. Both are capable of giving catalyst of high activity and good selectivity. The degree of selectivity as between one or the other may vary depending on the other factors listed above and experiments may be necessary to determine which element is preferred in any given situation.

The amount of the Group V element in relation to the Group III metal can be quite small seeing that only a surface treatment is necessary. Preferably the amount of Group V element is from 0.01 to 0.5 g.-atoms/g. atoms of Group VIII element.

The other element or radical of the Group V compound is preferably an organic radical, particularly a hydrocarbon radical or an alkoxy radical. Thus it may be an alkyl, cycloalkyl or aryl radical or a combination of such groups e.g. an aralkyl radical. The radicals can be the same or different in any given compound. The radical may contain from 1 to 20 carbon atoms. The size of the radical has been found to have a significant effect on the selectivity conferred. Without being bound by any theory it is suggested that the size of the element or radical determines the number of molecules that can be adsorbed onto a given area of metal surface and hence the spacing of the atoms of the Group V element on the metal surface. With a small radical the Group V atoms will be more closely spaced and the area of free metal surface between the Group V atoms correspondingly smaller.

When the Group V element is bismuth the preferred X radicals are methyl, ethyl, n-propyl, n-butyl or phenyl.

The Group V compound is readily adsorbed onto the metal surface and mild conditions can be used if desired for example atmospheric temperature (0–50° C.) and preferably atmospheric pressure. If desired the modified metal surface may be used catalytically under these conditions also. The compound may be used in liquid or vapour phase depending on its boiling point and either by itself or in an inert liquid or gaseous diluent. It may be used with an inert saturated hydrocarbon diluent. When the Group V compound is used under these conditions it is believed that the whole compound is adsorbed and remains on the surface as the compound.

More severe conditions can however be used for the contacting or can be applied after the low temperature contacting described above. Thus elevated temperatures of for example 50–250° C. and elevated pressures can be used simultaneously or subsequently. Again the compound can be in liquid or vapour phase and can have a liquid or vapour diluent. The diluent may be inert or it may be a reducing gas such as hydrogen. Treatment in hydrogen is, in fact, preferred either simultaneously with the contacting or subsequently. It is believed that at temperatures of 50–250° C. and, preferably, under reducing conditions the Group V compound is decomposed leaving only the Group V element on the metal surface. If the subsequent use to which the catalyst is put includes elevated temperature or pressure or reducing conditions, it follows that the Group V compound will be decomposed in the early stages of the process.

The pressure used during the contacting or during subsequent treatment can be 0 to 1000 p.s.i.g.

If desired, two or more treatments with the Group V compound may be given. Preferably the Group V compound is decomposed simultaneously with or subsequently to the first treatment, before the second treatment.

The temperature of the second treatment may be 50 to 250° C. or 0 to 50° C. In the latter case the catalyst may be subsequently heated to 50 to 250° C.

The invention includes a process for converting organic compounds, particularly for hydrogenating unsaturated organic compounds, comprising contacting an organic compound under conversion conditions with a catalyst prepared as described above.

The invention further provides a process for hydrogenating unsaturated organic compounds which comprises contacting an unsaturated organic compound under hydrogenating conditions with a catalyst prepared as described above.

As indicated earlier, the nature of the catalyst preparation will affect the activity and particularly the selectivity of the catalyst. Thus the catalyst prepared by contacting the metal surface at low temperatures of 0–50° C. has been found in most cases to have selectivity for the conversion of di-olefins to mono-olefins without conversion of mono-olefins or aromatics if used under the same low temperature conditions. Catalysts prepared from Group V compounds containing organic radicals of small size are more selective than catalysts prepared from Group V compounds with larger organic radicals under similar conditions.

Catalysts prepared under higher temperature or pressures tend to show selectivity for hydrogenation of di- and mono-olefins to paraffins, again without appreciable hydrogenation to aromatics. Again, the use of Group V compounds with small size organic radicals gives the more selective catalysts.

Preferred feedstocks contain unsaturated non-aromatic hydrocarbons alone or in admixture with aromatics. Saturated hydrocarbons may also be present. Suitable feedstocks are hydrocarbons or hydrocarbon mixtures having 2–20 carbon atoms, for example unsaturated petroleum fractions. Preferably the feedstocks are sulphur-free.

Suitable ranges of process conditions for the hydrogenation may be

Temperature—0–250° C.
Pressure—0–3000 p.s.i.g.
Space velocity—0.1–10 v./v./hr.
$H_2$:HC mole ratio—0.1–20:1

The invention is illustrated by the following examples.

EXAMPLE 1

A catalyst was prepared by impregnating sepiolite with a solution of nickel formate in ammonia solution to give a nickel content of 10% wt. and drying at 120° C. The nickel formate was then reduced to nickel at 375° C. for 4 hours in a stream of hydrogen flowing at 1000 v./v./hr.

Portions of this catalyst were then treated with various compounds of Group V elements and tested for hydrogenation activity and selectivity. The feedstocks were (a) 10% vol. isoprene in n-heptane and (b) 10% vol. benzene in cyclohexane. Feedstocks (a) and (b) were passed in succession over the catalysts. The hydrogenation process conditions, other than temperature, were Pressure—atmospheric
Space velocity—2 LHSV
$H_2$:HC mole ratio—8:1

The Group V compounds used, the conditions of treatment with the Group V compound, the hydrogenation temperature used and the results obtained are set out in Tables 1 and 2 following:

TABLE 1

| | Group V compound used | | | | | | | | | | | |
|---|---|---|---|---|---|---|---|---|---|---|---|---|
| | $Et_3P$ | | | $nBu_3P$ | | | n-octyl$_3$P | | | $\phi_3P$ | | |
| | Isoprene | | Benzene activity | Isoprene | | Benzene activity | Isoprene | | Benzene activity | Isoprene | | Benzene activity |
| Pretreatment | Activity | Selectivity | | Activity | Selectivity | | Activity | Selectivity | | Activity | Selectivity | |
| Catalyst 1—$X_3P$ in n-decane passed over freshly reduced catalyst for 1 hour at room temperature (° C.). Hydrogenation at room temperature. | 99 | 93 | | 99 | 78 | | 100 | 22 | | 100 | 51 | |
| Catalyst 2—Catalyst 1 heated in $H_2$ at 100° C. for 1 hour. Hydrogenation at 100° C. | 100 | 0 | 27 | 100 | 0 | 76.2 | 100 | 0 | 100 | 100 | 0 | 31.5 |
| Catalyst 3—Heat Catalyst 2 to 100° C. in in $H_2$ for 1 hour and then cool to 100° C. Hydrogenation at 100° C. | 100 | 0 | 25 | 100 | 0 | 83 | 100 | 0 | 100 | 100 | 0 | 37.5 |

NOTE:

$$\text{Isoprene activity} = \frac{\text{isopentane plus methyl butenes}}{\text{isopentane plus methyl butenes plus isoprene}} \times 100$$

$$\text{Isoprene selectivity} = \frac{\text{methyl butenes}}{\text{methyl butenes plus isopentane}} \times 100$$

$$\text{Benzene activity} = \frac{\text{cyclohexane}}{\text{cyclohexane plus benzene}} \times 100$$

TABLE 2

| Pretreatment | nBu₃Sb Isoprene Activity | nBu₃Sb Isoprene Selectivity | nBu₃Sb Benzene activity | φ₃Sb Isoprene Activity | φ₃Sb Isoprene Selectivity | φ₃Sb Benzene activity |
|---|---|---|---|---|---|---|
| Catalyst 4—X₃Sb in n-decane passed over freshly reduced catalyst for 1 hour at room temperature. Hydrogenation at room temperature | 97 | 74 | | 92 | 71 | |
| Catalyst 5—Catalyst 4 heated in H₂ at 100° C. for 1 hour. Hydrogenation at 100° C | 100 | 22 | 17 | 100 | 35 | 18 |
| Catalyst 6—Heat Catalyst 5 to 200° C. in H₂ for 1 hour and then cool to 100° C. Hydrogenation at 100° C | 100 | 6.5 | 10 | 100 | 0 | 18 |

The results using Catalyst 1 of Table 1 show that when phosphiding and use occurs at room temperature the catalyst has selectivity for converting di-olefins to mono-olefins, particularly when using tri-ethyl phosphine. The selectivity is in the order Et₃P>n-Bu₃P>n-octyl₃P, φ₃P and is shown in FIG. 1.

Comparing the relative effects of phosphorus and antimony (i.e. comparing Catalyst 1 of Table 1 with Catalyst 4 of Table 2), there is little difference when using the tri-n-butyl compound, but a rather great difference when using the tri-phenyl compound.

Figure 2:
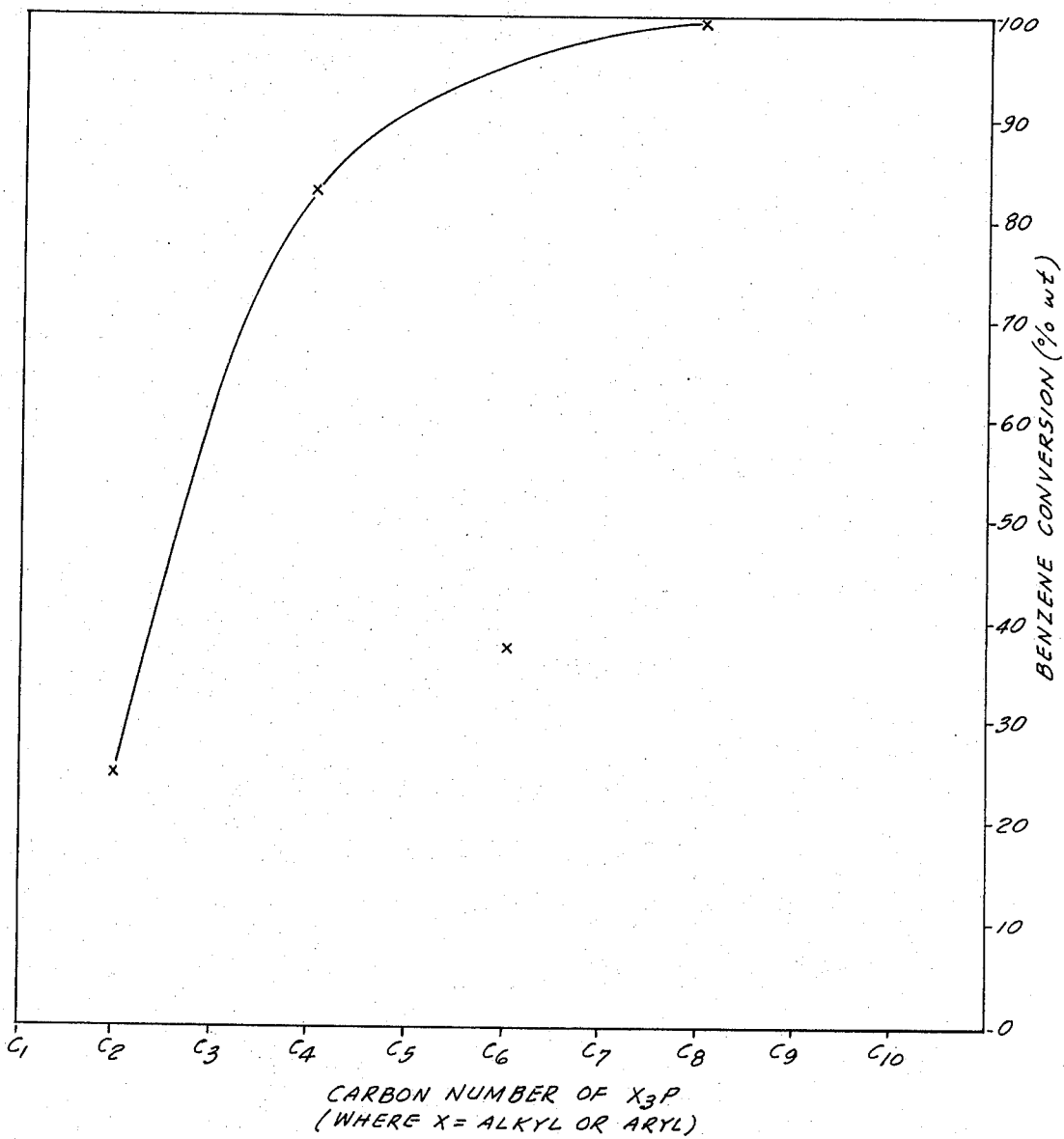

The results of Catalyst 2 of Table 1 are similar to results with Catalyst 3 showing that heating at 100° C. or 200° C. makes little difference. These two catalysts convert isoprene to isopentane. Selectivity for olefin hydrogenation without extensive aromatic hydrogenation occurs with the tri-ethyl and tri-phenyl compounds and the selectivity is Et₃P, φ₃P>nBu₃P>n-octyl₃P and is shown in FIG. 2.

Comparing the relative effects of phosphorus and antimony (i.e. Catalysts 2 and 3 of Table 1 with Catalysts 5 and 6 of Table 2) it will be seen that benzene hydrogenation activity is less with the antimony compounds. The antimony compounds also show some selective di-olefin hydrogenation activity. Here the difference between 100 and 200° C. for the catalyst treatment is significant.

The phosphorus content of these catalysts decrease in the order (C₂H₅)₃P>(nC₄H₉)₃P>(nC₈H₁₇)₃P The phosphorus nickel atomic ratios for the catalysts of Table 1 were as follows:

Et₃P ---------------------------------- 0.126:1
n-Bu₃P --------------------------------- 0.095:1
n-Octyl₃P ------------------------------ 0.045:1

It will be noted that the smaller the organic radical the greater the amount of phosphorus adsorbed.

Figure 3:
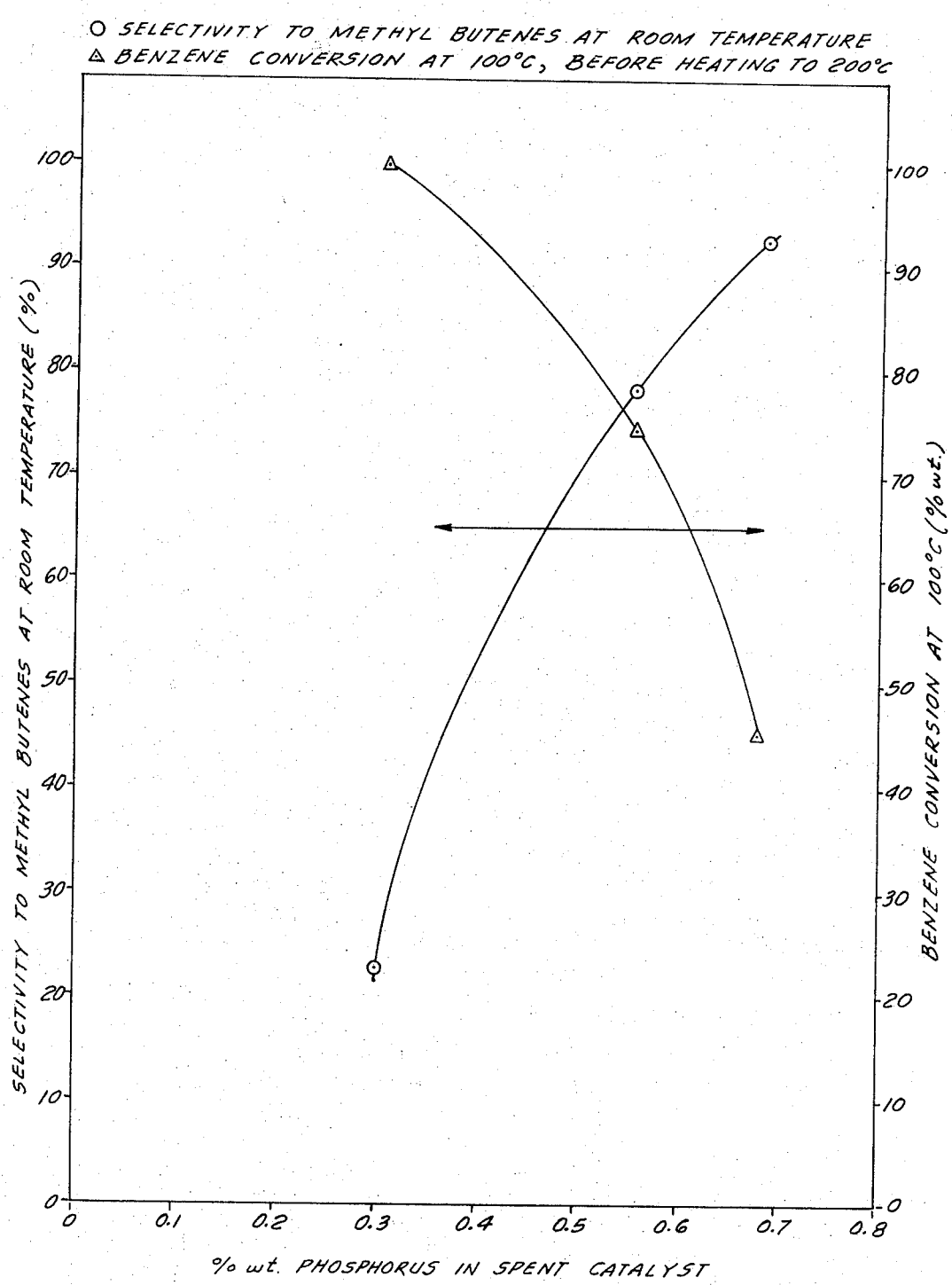

For the three alkyl phosphine treated catalysts there is a direct relationship between selectivity to methyl butenes and phosphorus content. This is shown in FIG. 3.

EXAMPLE 2

Catalyst 2 of Example 1 was rephosphided with triethyl phosphine and then tested for hydrogenation activity as in Example 1. The treatment conditions, the hydrogenation temperature and the results obtained are shown in Table 3 below.

TABLE 3

| Pretrement | Isoprene Activity | Isoprene Selectivity | Benzene activity |
|---|---|---|---|
| Catalyst 7—Catalyst 2 rephosphided (after 76 hours) with Et₃P in n-decane at room temperature for 1 hour. Raise temperature to 100° C. in H₂. Hydrogenation at 100° C. after 120 hours | 100 | 0 | 4 |

Table 3 shows that the rephosphiding increased the selectivity of the catalyst for hydrogenating isoprene to isopentane without hydrogenating benzene, without adversely affecting the activity.

EXAMPLE 3

Further portions of the 10% wt. nickel-sepiolite catalyst of Example 1 were phosphided with triethyl phosphine at elevated temperature in hydrogen (i.e. so that there was simultaneous adsorption and decomposition of the phosphine). The catalysts, designated Catalysts 8 and 9 were tested for hydrogenation activity as in Example 1. The treatment conditions, the hydrogenation temperature and the results obtained are shown in Table 4 below.

TABLE 4

| Pretreatment | Isoprene Activity | Isoprene Selectivity | Benzene activity |
|---|---|---|---|
| Catalyst 8—Pass Et₃P in n-decane over freshly-reduced catalyst at 100° C. in H₂ for 4 hours. Hydrogenation at 100° C. after 100 hours | 100 | 0 | 7 |
| Catalyst 9—Pass Et₃P in n-decane over freshly reduced catalyst at 100° C. in H₂ for 3 hours. Hydrogenation at 100° C. after 73 hours | 100 | 84 | 6 |

EXAMPLE 4

A catalyst was prepared in the same way as Catalyst 8 and was left overnight in an atmosphere of hydrogen at 100° C. It was then tested for hydrogenation activity using as feedstock a mixture of 25% volume isoprene and 75% volume benzene. The process conditions were 120° C. atmospheric pressure and a hydrogen rate of 500 GHSV. The feedstock space velocity was varied during the run. The results obtained are shown in Table 5 below.

TABLE 5

| Hours on stream | Space velocity (v./v./hr.) | Isoprene Activity | Isoprene Selectivity | Benzene activity |
|---|---|---|---|---|
| 0–17½ | 1 | 100 | 0 | <2 |
| 17½–18½ | 2 | 100 | 0 | 1 |
| 18½–19½ | 4 | 100 | 0 | 0.5 |

Table 5 shows the high activity and the low selectivity of the catalyst which was maintained over an extended period. The catalyst was left to stand overnight in hydrogen at 100° C. twice during the run so the total time of contact of the catalyst with hydrogen was considerably greater than the hours on stream shown.

EXAMPLE 5

Catalysts 10 to 12 were prepared as described in Table 6 and tested for isoprene hydrogenation. The results show that the fully reduced nickel-on-sepiolite, pretreated with either triethyl or tri-n-butyl phosphine at room temperature hydrogenates isoprene under ambient conditions to a product rich in α-olefins. In contrast, the sulphided nickel sepiolite (catalyst 12) produces an equilibrium distribution of olefins containing mainly 2-methyl butene-2 under similar conditions. Catalyst 12 does not form part of the present invention and is included for comparative purposes only.

TABLE 6.—THE EFFECT OF CATALYST PRETREATMENT ON THE DISTRIBUTION OF METHYL BUTENES FROM ISOPRENE AT ROOM TEMPERATURE

Test conditions: Feed—10 percent v./v. isoprene in n-heptane; Temperature—20° C.; Feed flow rate—2 LHSV; H₂ flow rate—750 GHSV.

| Pretreatment | | Hours on Stream | Isoprene hydrogenation (percent) | | Methyl butenes isomer distribution (percent) | | |
|---|---|---|---|---|---|---|---|
| | | | Activity | Selectivity | C−C−C=C | C−C−C(C)=C | C−C(C)=C−C |
| Catalyst 10 | Pass a 5% solution of Et₃P in n-heptane over fully-reduced catalyst for one hour at room temperature. Test at room temperature. | 0-0.5 | 99 | 92 | 14.3 | 44.0 | 41.7 |
| | | 2.5-3 | 100 | 81 | 8.4 | 42.4 | 49.2 |
| | | 5-5.5 | 100 | 74 | 1.0 | 45.0 | 53.9 |
| Catalyst 11 | Pass a 5% solution of Et₃P in n-heptane over the catalyst 10 at room temperature. Test at room temperature. | 6.5-7 | 74 | 99 | 22.1 | 35.9 | 42.0 |
| | | 8.5-9 | 100 | 89 | 15.2 | 41.0 | 43.8 |
| | | 10-11 | 100 | 87 | 12.8 | 41.3 | 45.9 |
| Catalyst 12 | Pass a 5% solution of thiophen in n-decane over fully-reduced catalyst for 1.5 hours at room temperature. Test at room temperature. | 0-0.5 | 100 | 97 | 0.2 | 11.0 | 88.8 |
| | | 4-4.5 | 100 | 98 | 1.4 | 14.7 | 83.9 |
| Thermodynamic equilibrium values at 27° C. | | | | | 0.2 | 11.0 | 88.8 |

EXAMPLE 6

Catalysts 13 and 14 were prepared and tested as described in Table 7. Catalyst 14 demonstrates the improvement in selectivity obtained by repeating the treatment with tri-n-butyl phosphine.

where M is phosphorus at least one of the X radicals may be $R_2P(CH_2)_n-$ or

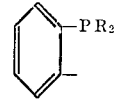

TABLE 7

Test conditions: Feed—10 percent v./v. isoprene in n-heptane; Temperature—20° C.; Feed flow rate—2 LHSV; H₂ flow rate—750 GHSV.

| Pretreatment | Hours on stream | Isoprene hydrogenation | | | Methyl butenes isomer distribution (percent) | | |
|---|---|---|---|---|---|---|---|
| | | Activity (percent) | Selectivity to mono olefins (percent) | $\frac{\alpha\text{-olefins}}{\text{total olefins}} \times 100$ | 3-methyl butene-1 | 2-methyl butene-1 | 2-methyl butene-2 |
| Catalyst 13—Soak 5 ml. of fully-reduced nickel-on-sepiolite in 30 ml. of a 4.9 percent solution of nBu₃P in n-heptane for 1 hour. Drain off the solution and wash the catalyst with 40 ml. of n-heptane. | 2-2½ | 100 | 75 | 46 | 4.8 | 41.3 | 53.7 |
| | 3-3¾ | 100 | 79 | 48 | 5.5 | 42.1 | 52.4 |
| | Stood for 16 hours in H₂ | | | | | | |
| | 4¾-5¼ | 100 | 81 | 50 | 6.1 | 43.7 | 50.2 |
| Catalyst 14—Heat the catalyst at 100° C. overnight in hydrogen. Cool to room temperature and retreat with nBu₃P as above. | 1-1½ | 100 | 90 | 54 | 13.6 | 40.7 | 45.7 |
| | 2-2½ | 100 | 88 | 54 | 13.2 | 40.4 | 46.4 |
| | Stood for 64 hours in H₂ | | | | | | |
| | 3½-4 | 100 | 88 | 56 | 13.8 | 42.1 | 44.1 |

EXAMPLE 7

A platinum exchanged silica catalyst (catalyst 15) was prepared and tested as described in Table 8.

TABLE 8

Test conditions: Feed—10 percent v./v. isoprene in n-heptane; Temperature—100° C.; Feed flow rate—2 LHSV; H₂ flow rate—750 GHSV.

| Pretreatment | Hours on stream | Isoprene hydrogenation | | | Methyl butenes isomer distribution (percent) | | |
|---|---|---|---|---|---|---|---|
| | | Activity (percent) | Selectivity to mono olefins (percent) | $\frac{\alpha\text{-olefins}}{\text{total olefins}} \times 100$ | 3-methyl butene-1 | 2-methyl butene-1 | 2-methyl butene-2 |
| Catalyst 15—Soak 5 ml. of 3 percent weight platinum exchanged silica (previously reduced) with 30 ml. of a 4.9 percent solution of nBu₃P in n-heptane for 1 hour. Drain off the solution and wash the catalyst with 30 ml. of n-heptane. Raise the temperature to 100° C. | ½-1 | 56 | 77 | 60 | 18.3 | 41.3 | 40.4 |
| | 1½-2½ | 55 | 75 | 62 | 19.4 | 42.8 | 37.8 |
| Untreated reduced catalyst | 0-3 | 100 | 0 | | | | |

What we claim is:

1. A method of preparing a catalyst which method comprises contacting a Group VIII metal surface of nickel or platinum with a compound of an element of Group V at a temperature in the range 0 to 250° C. so that the Group V element or compound is adsorbed onto the metal surface, the Group V compound having the general formula $X_3M$ where X is an organic radical containing from 1 to 20 carbon atoms, said radical being alkyl, cycloalkyl, alkoxy, aryl or combinations of such radicals, the X radicals being the same or different, and M is an atom of phosphorus, arsenic or antimony; and in the case where M is phosphorus at least one of the X radicals may be $R_2P(CH_2)_n-$ or where $n$ is zero or an integer from 1 to 20 and where R is a $C_1$ to $C_{20}$ hydrocarbon radical, the amount of the Group V compound being from 0.01 to 0.5 g.-atoms/g. atom of Group VIII metal.

2. A method according to claim 1 wherein the Group VIII metal content of the supported catalyst is from 0.1 to 50% by weight of total catalyst.

3. A method according to claim 2 wherein the Group VIII metal is nickel and comprises 5 to 35% by wt. of the catalyst.

4. A method according to claim 1 wherein the Group V compound is triphenyl phosphine, tricyclohexyl phosphine, trioctyl phosphine, tri-isopropyl phosphine, triethyl phosphine or tri n-butyl phosphine.

5. A method according to claim 1 wherein the Group V compound is tri n-butyl stibine or triphenyl stibine.

6. A method according to claim 1 wherein the Group V compound is contacted with the metal surface at 0 to 50° C.

7. A method according to claim 1 wherein the Group V compound is contacted with the metal surface at a temperature of 50 to 250° C. to decompose the Group V compound.

8. A method according to claim 7 wherein the catalyst is subsequently heated to from 50 to 250° C. to decompose the Group V compound.

9. A method according to claim 7 wherein the treatment at 50 to 250° C. is carried out in the presence of hydrogen.

10. A method according to claim 7 wherein the catalyst is given one or more further treatments with the Group V compound at 0 to 50° C. without subsequent heatings to 50 to 250° C.

11. A method according to claim 7 wherein the catalyst is given one or more further treatments with the Group V compound at 50 to 250° C. or at 0 to 50° C. with subsequent heating to 50–250° C.

References Cited

UNITED STATES PATENTS

| | | | |
|---|---|---|---|
| 2,511,453 | 6/1950 | Barry | 260—677 H |
| 2,681,938 | 6/1954 | Lindlar | 260—677 H |
| 2,882,242 | 4/1959 | Weber | 252—441 X |
| 3,123,574 | 3/1964 | Zajcew | 252—472 X |
| 3,144,414 | 8/1964 | Silverman | 252—437 |
| 3,144,415 | 8/1964 | Silverman | 252—437 |
| 3,253,039 | 5/1966 | Rylander et al. | 252—472 X |
| 3,422,147 | 1/1969 | Fenton | 252—431 P X |
| 3,463,830 | 8/1969 | Dunning et al. | 252—431 P X |
| 3,493,617 | 2/1970 | Shryne et al. | 252—431 P X |

PATRICK P. GARVIN, Primary Examiner

U.S. Cl. X.R.

252—430, 431 R, 437, 441, 472; 260—677 H, 683

UNITED STATES PATENT OFFICE
CERTIFICATE OF CORRECTION

Patent No. 3,642,658   Dated February 15, 1972

Inventor(s) Allum et al.

It is certified that error appears in the above-identified patent and that said Letters Patent are hereby corrected as shown below:

Column 2, line 34, "catalyst" should be --catalysts--.

Column 2, line 41, "Group III" should be --Group VIII--.

Column 4, line 8, "temperature" should be --temperatures--.

Column 5, line 24, "great" should be --greater--.

Column 5, line 26, "of" should be --with--.

Column 8, Table 6, 5th entry under C-C-C̈=C (with C substituent), "41.0" should be --40.

Claim 8, "Claim 7" should be --Claim 6--.

Claim 10, "heatings" should be --heating--.

Signed and sealed this 12th day of September 1972.

(SEAL)
Attest:

EDWARD M. FLETCHER, JR.
Attesting Officer

ROBERT GOTTSCHALK
Commissioner of Patent